July 17, 1923.
J. H. ARTMAN
AUTOMATIC STOCK FOUNTAIN
Filed May 22, 1920
1,461,744
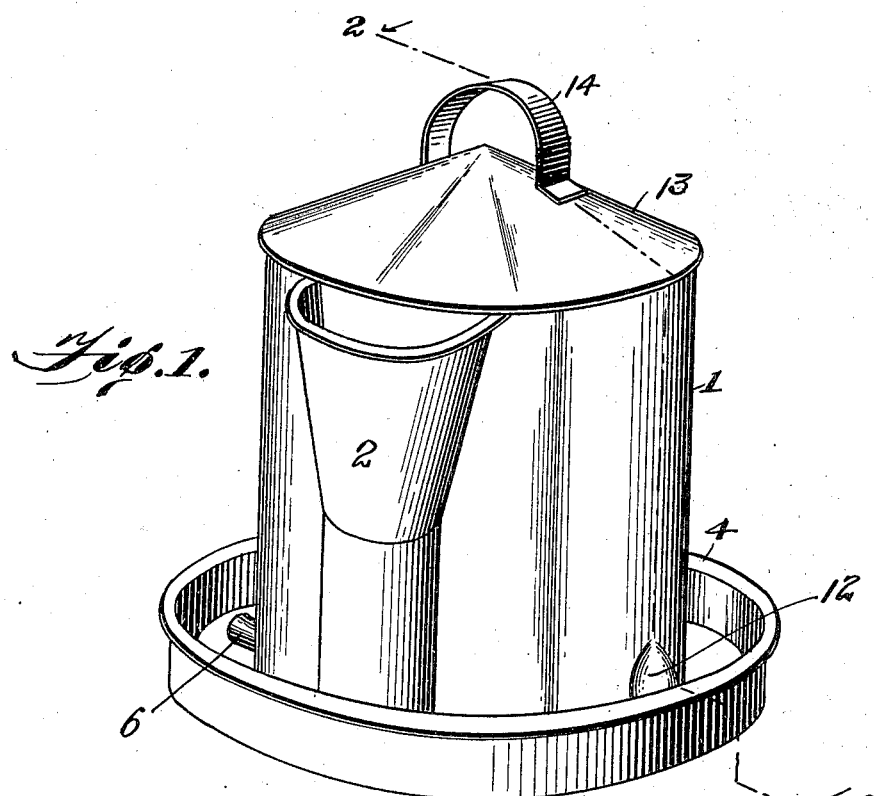
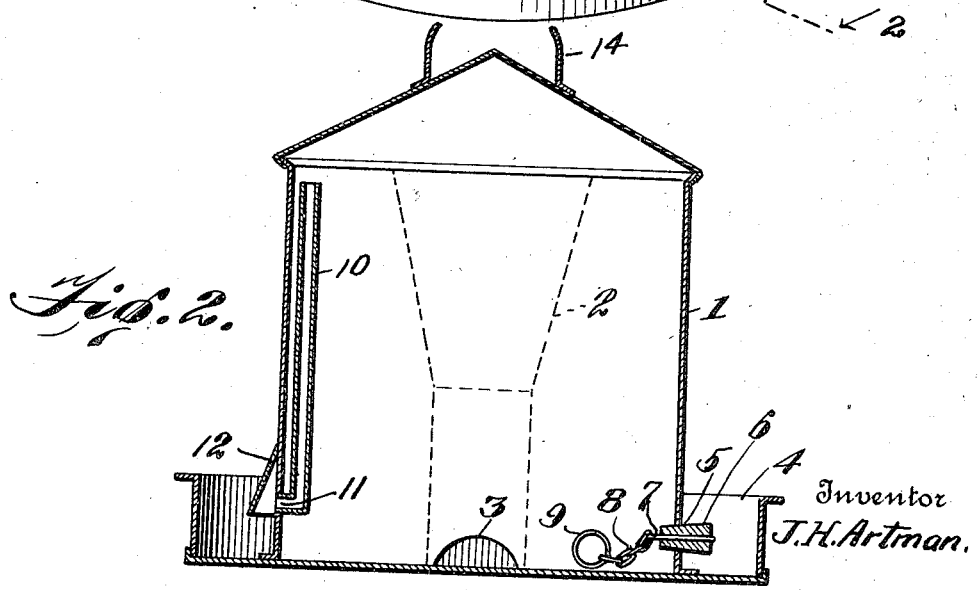
Inventor
J. H. Artman.

Patented July 17, 1923.

UNITED STATES PATENT OFFICE.

JOSEPH H. ARTMAN, OF LAUREL, NEBRASKA.

AUTOMATIC STOCK FOUNTAIN.

Application filed May 22, 1920. Serial No. 383,449.

*To all whom it may concern:*

Be it known that I, JOSEPH H. ARTMAN, a citizen of the United States, residing at Laurel, in the county of Cedar and State of Nebraska, have invented certain new and useful Improvements in Automatic Stock Fountains, of which the following is a specification, reference being had therein to the accompanying drawings.

This invention relates to an automatic stock fountain, and has for its object the production of a simple and compact fountain for watering stock or poultry, which is efficient in operation and comparatively inexpensive to manufacture.

With this and other objects in view, my invention comprises a certain novel combinations, constructions and arrangements of parts as will be hereinafter described, illustrated in the accompanying drawings, and more particularly pointed out in the appended claim.

In the drawings:

Figure 1 is a perspective view of a fountain constructed in accordance with the present invention, while Figure 2 is a sectional view taken on line 2—2, Figure 1, and looking in the direction of the arrows.

Referring to the drawings by numerals, 1 designates the main body or tank of the fountain, to the side of which is integrally secured a funnel 2; an opening 3 is formed in the side of the tank and this opening communicates with the interior of the funnel 2, whereby, upon pouring sufficient water into the top of the funnel, the tank will be filled.

A drinking trough 4 is formed around the base of the tank 1, and an outlet-opening 5 permits water to pass from the tank into the trough 4, but while the tank is being filled, by pouring water into the funnel 2, or while the tank (filled with water) is being transported, the outlet-opening 5 may be closed by the stopper 6.

The stopper 6 is provided with a pin 7, extending therethrough, and to the inner end of the pin is fastened a chain 8; to the inner end of which chain is fastened a ring 9; the ring 9 is larger in diameter than the outlet-opening 5, hence, anchoring the stopper to the tank 1, so that the stopper will always be ready and convenient for closing the outlet-opening 5, at the will of the operator.

A vertical air tube 10 is positioned within the tank 1 and has its upper end opening near the top of the tank, whereas, its lower end opens, at 11, into the trough 4, and over this lower end or opening 11 is a hood 12, which protecting hood is only open at its bottom, and when the water rises in the trough, by being discharged out of the opening 5, the bottom of the hood 12 will be sealed or closed, thereby creating a vacuum in the tank 1. The hood 12 prevents foreign substances from being forced directly into the lower end 11 of tube 10.

A top 13 is formed upon the tank and a suitable grip or handle 14 is secured to the top 13.

Upon water being poured into the funnel 2, air will be forced out of the tank through the air tube 10.

From the foregoing description, it will be understood that my drinking fountain is practically a one piece or an integral structure, necessarily including all of the parts mentioned to make an efficient device, and I consider that I have produced a valuable and new article of manufacture, inasmuch as it has been proven, from actual, practical demonstration, with the working fountain, that all the parts are essential and that it is necessary to include the parts in a complete and compact device for the best results.

While I have described the preferred embodiment of my invention, and have illustrated the same in the accompanying drawings, certain minor changes or alterations may appear to one skilled in the art to which this invention relates, during the extensive manufacture of the same and I, therefore, reserve the right to make such alterations or changes as shall fairly fall within the scope of the appended claim.

What I claim is:

As a new article of manufacture, a drinking fountain comprising a tank having a closed top, a drinking trough located at the bottom of the tank, said tank provided with an outlet-opening opening into said trough, a vertical air tube having its upper end opening into said tank and its lower end opening into said trough, and a protecting hood secured to the side of said tank and overhanging the lower end of said tube below the top of the trough, said hood being open at its lower end only and adapted to be closed when liquid rises in the trough.

In testimony whereof I hereunto affix my signature.

JOSEPH H. ARTMAN.